(12) United States Patent
Leshniak

(10) Patent No.: US 11,363,172 B1
(45) Date of Patent: Jun. 14, 2022

(54) CAMERA ENCLOSURE FOR THERMAL MANAGEMENT

(71) Applicant: Applied Materials, Inc., Santa Clara, CA (US)

(72) Inventor: Itai Leshniak, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 17/131,239

(22) Filed: Dec. 22, 2020

(51) Int. Cl.
*H04N 5/225* (2006.01)
*G03B 17/55* (2021.01)
*G03B 17/02* (2021.01)

(52) U.S. Cl.
CPC ......... *H04N 5/22521* (2018.08); *G03B 17/02* (2013.01); *G03B 17/55* (2013.01); *H04N 5/2252* (2013.01)

(58) Field of Classification Search
CPC ............... H04N 5/2251; H04N 5/2252; H04N 5/22521; G03B 17/02; G03B 17/08; G03B 17/55
See application file for complete search history.

(56) References Cited

U.S. PATENT DOCUMENTS

| | | | | |
|---|---|---|---|---|
| 4,547,809 A | * | 10/1985 | Southgate | H04N 5/22521 348/374 |
| 2016/0301819 A1 | * | 10/2016 | Petty | G02B 7/008 |
| 2017/0331996 A1 | * | 11/2017 | Bull | G03B 5/00 |
| 2018/0316837 A1 | * | 11/2018 | Ishida | H01L 23/3737 |
| 2021/0021747 A1 | * | 1/2021 | Brzobohaty | G06T 7/0004 |

* cited by examiner

*Primary Examiner* — Daniel M Pasiewicz
(74) *Attorney, Agent, or Firm* — Kilpatrick Townsend & Stockton LLP

(57) ABSTRACT

Exemplary cameras may include a housing. The housing may include a forward section defining a forward internal compartment. The housing may include a rear section defining a rear internal compartment. The rear section may include a heat dissipation element. The forward section and the rear section may be separated by an air gap that extends through an entire thickness of the housing. The housing may include a communications conduit coupling the forward internal compartment with the rear internal compartment. The cameras may include an imaging sensor disposed within the forward internal compartment. The cameras may include a processing unit disposed within the rear internal compartment and communicatively coupled with the imaging sensor.

20 Claims, 6 Drawing Sheets

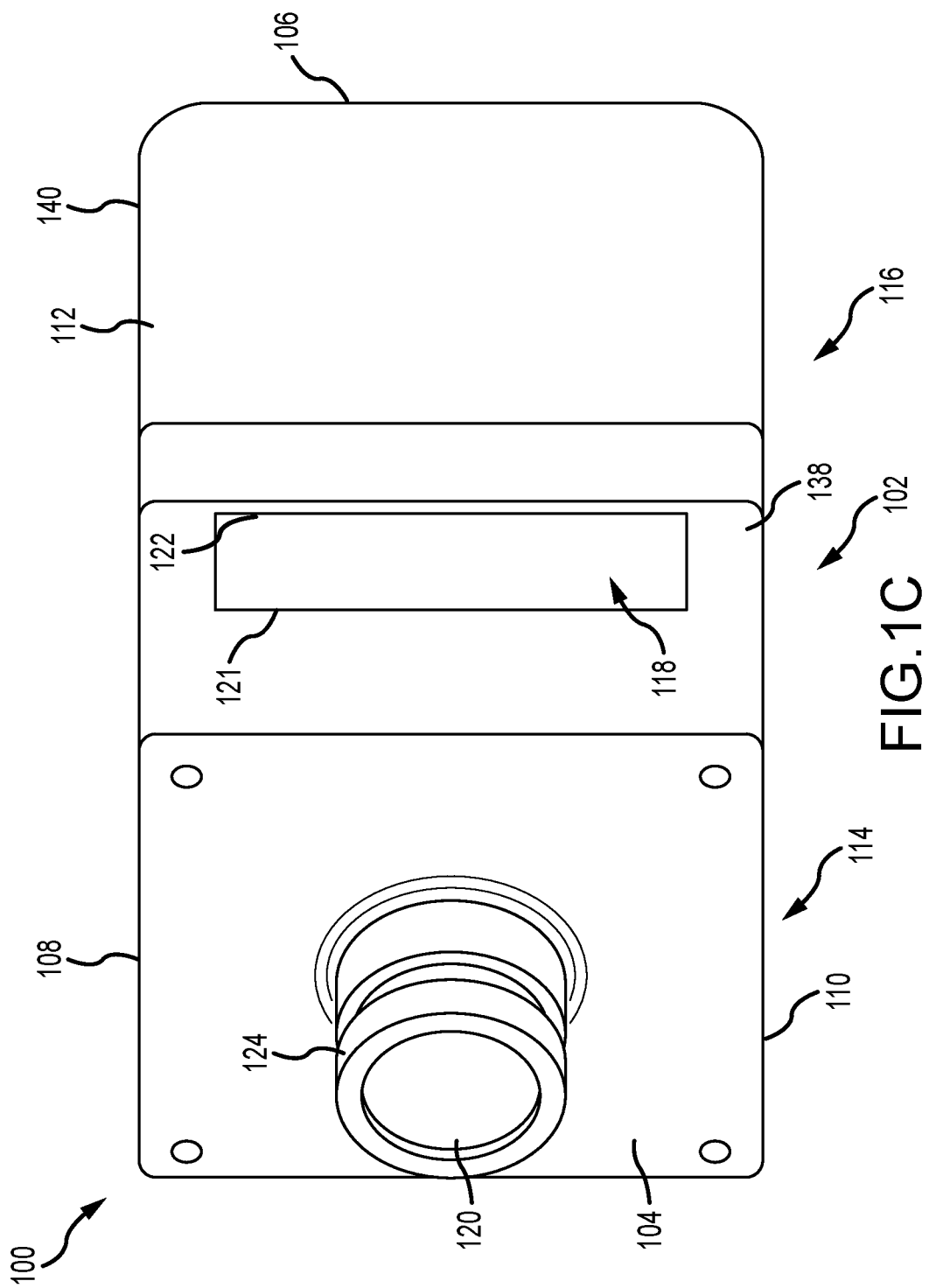

CAMERA ENCLOSURE FOR THERMAL MANAGEMENT

TECHNICAL FIELD

The present technology relates to components and apparatuses for digital cameras. More specifically, the present technology relates to camera housings for better thermal management.

BACKGROUND OF THE INVENTION

Digital imaging devices utilize an imaging sensor that operated by a controller, such as a processing unit. During operation, these processing units may generate large amounts of heat, which may exceed the operating temperature range of the imaging sensor. This excess heat may create noise or other distortions that disrupt the operation of the imaging sensor. In particular, the noise may decrease the dynamic range of the imaging sensor, especially in low light settings. This may lead to the camera producing lower quality images that may include defects, such as image artifacts and/or fuzziness. Even small temperature increases may create such defects.

Thus, there is a need for improved cameras and camera components that can be used to produce high quality images in all conditions. These and other needs are addressed by the present technology.

BRIEF SUMMARY OF THE INVENTION

Exemplary cameras may include a housing. The housing may include a forward section defining a forward internal compartment. The housing may include a rear section defining a rear internal compartment. The rear section may include a heat dissipation element. The forward section and the rear section may be separated by an air gap that extends through an entire thickness of the housing. The housing may include a communications conduit coupling the forward internal compartment with the rear internal compartment. The cameras may include an imaging sensor disposed within the forward internal compartment. The cameras may include a processing unit disposed within the rear internal compartment and communicatively coupled with the imaging sensor.

In some embodiments, at least a portion of the housing disposed between the imaging sensor and the processing unit is formed from a low thermal conductivity material. The material may have a thermal conductivity of less than or about 3 W/mK. The communications conduit may be in alignment with the imaging sensor. The forward section may include a protrusion that defines a channel. A lens assembly may be disposed within the channel. The heat dissipation element may include one or both of a heat sink and a heat tube. The housing may include a medial section disposed between the forward section and the rear section. The air gap may be disposed between the forward section and the rear section. The medial section and the rear section may be separated by an additional air gap. The cameras may include a wireless assembly disposed in the medial section.

Some embodiments of the present technology may encompass camera housings. The camera housings may include a forward section defining a forward internal compartment. The camera housings may include a rear section defining a rear internal compartment. The rear section may include a heat dissipation element. The forward section and the rear section may be separated by an air gap that extends through an entire thickness of the camera housing. The camera housings may include a communications conduit coupling the forward internal compartment with the rear internal compartment.

In some embodiments, the air gap may be defined by and may be in contact only with exterior facing surfaces of the camera housing. The air gap may separate the forward section and the rear section by at least 1 mm. The camera housing may be one or both of dustproof and waterproof. The air gap may be open on at least two sides. The camera housing may include at least one frame member that couples the forward section and the rear section. At least 25% of an outer boundary of the air gap is devoid of structure elements. The communications conduit may have an inner diameter of less than or about 25 mm.

Some embodiments of the present technology may encompass camera housings. The camera housings may include a forward section defining a forward internal compartment. The camera housings may include a rear section defining a rear internal compartment. The rear section may include a heat dissipation element. The forward section and the rear section may be separated by an air gap having a width of at least 5 mm that extends through an entire thickness of the camera housing. The camera housings may include a communications conduit coupling the forward internal compartment with the rear internal compartment.

In some embodiments, the camera housings may include a medial section disposed between the forward section and the rear section. The air gap may be disposed between the forward section and the rear section. The medial section and the rear section may be separated by an additional air gap. A width of the air gap and a width of the additional air gap may be different. A width of the air gap and a width of the additional air gap may be equal.

Such technology may provide numerous benefits over conventional systems and techniques. For example, embodiments of the present technology may utilize a camera housing with an air gap that separates a processing unit and an imaging sensor to isolate the imaging sensor from heat generated by the processing unit and to create an airflow path for air to cool the camera. These and other embodiments, along with many of their advantages and features, are described in more detail in conjunction with the below description and attached figures.

BRIEF DESCRIPTION OF THE DRAWINGS

A further understanding of the nature and advantages of the disclosed technology may be realized by reference to the remaining portions of the specification and the drawings.

FIG. 1C shows an isometric view of the camera of FIG. 1A.

Figure 1A:
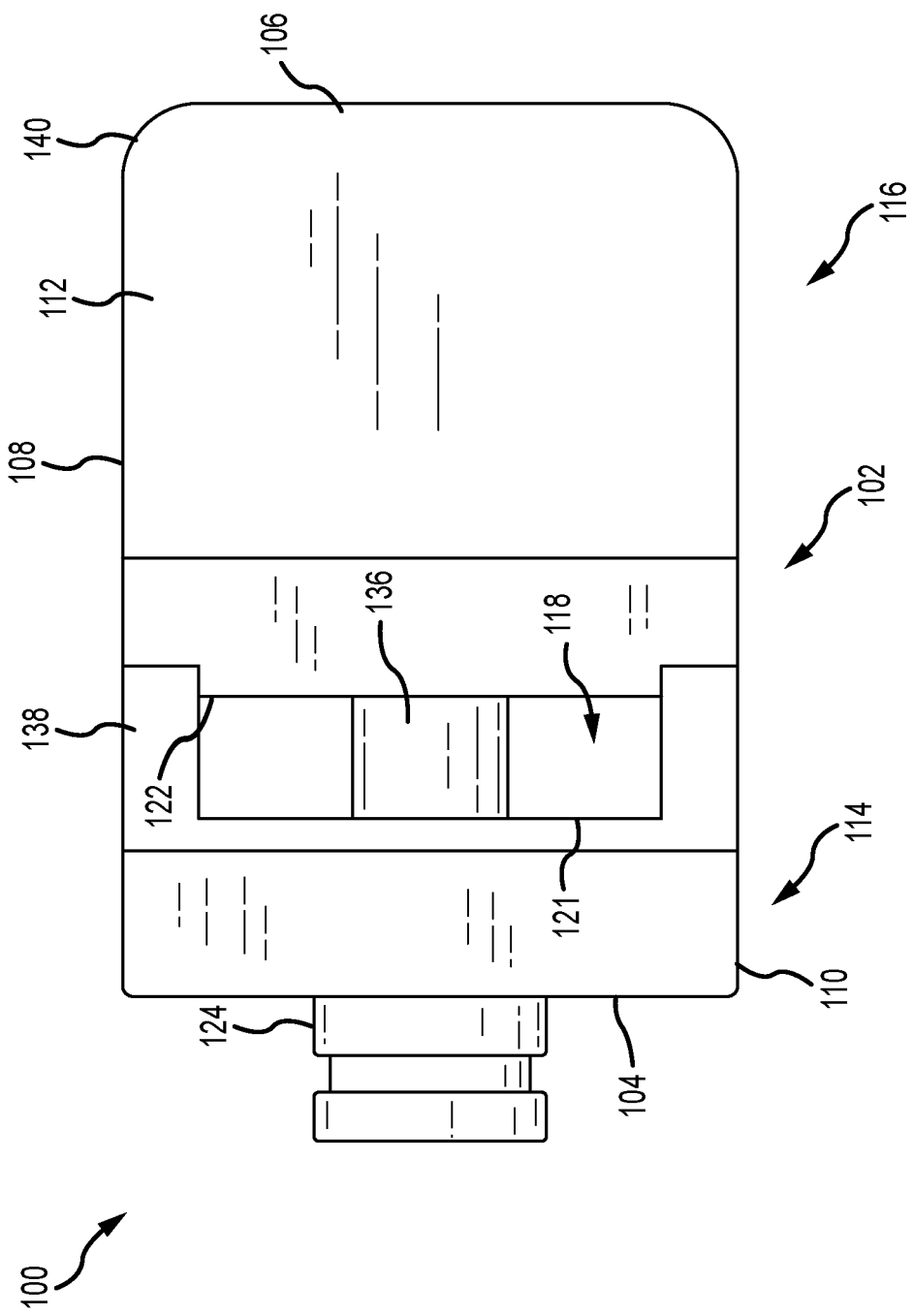
FIG. 1A shows a side elevation view of an exemplary camera according to some embodiments of the present technology.
Figure 1B:
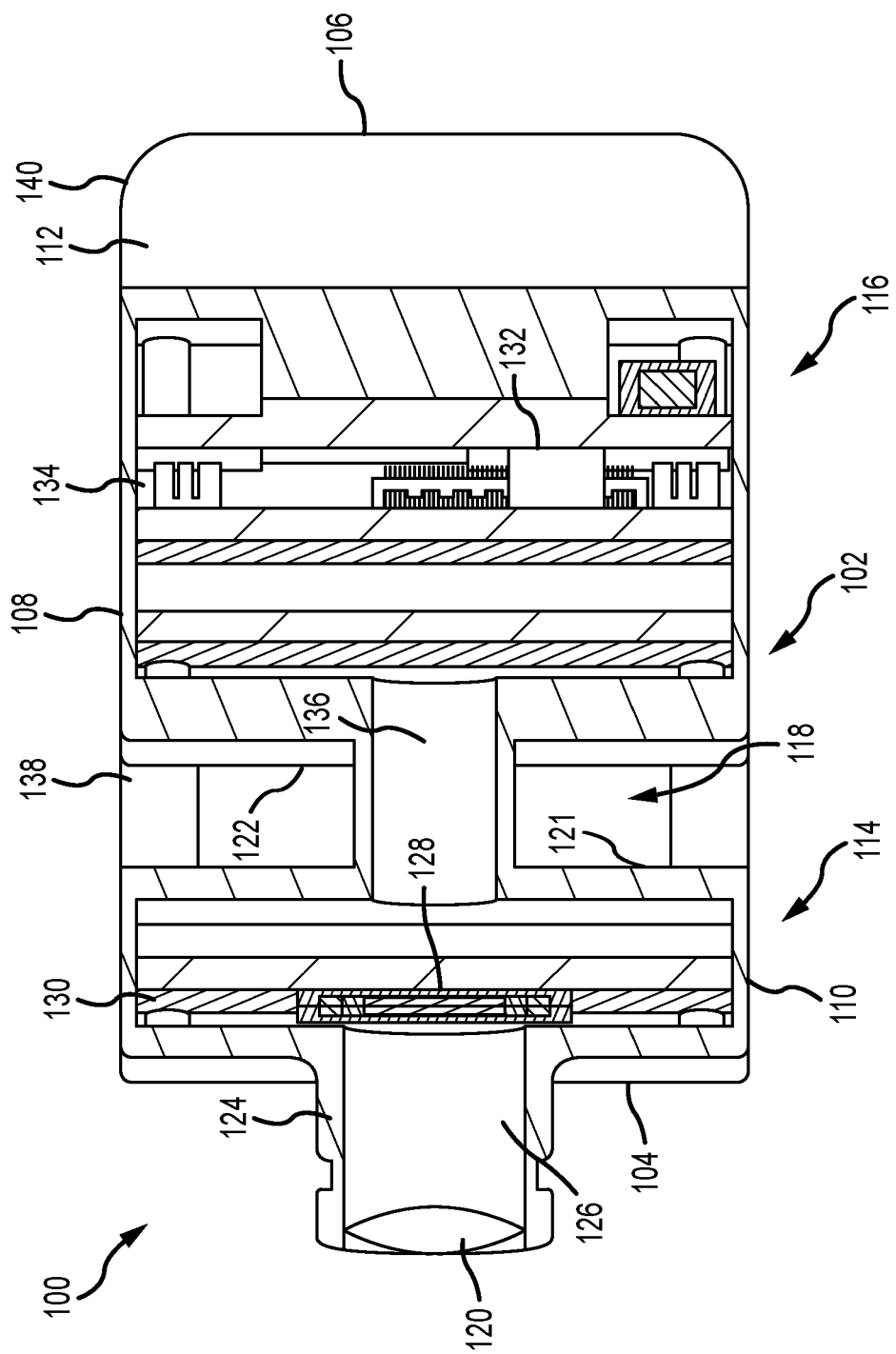
FIG. 1B shows a schematic cross-sectional side elevation view of the camera of FIG. 1A.
Figure 1D:
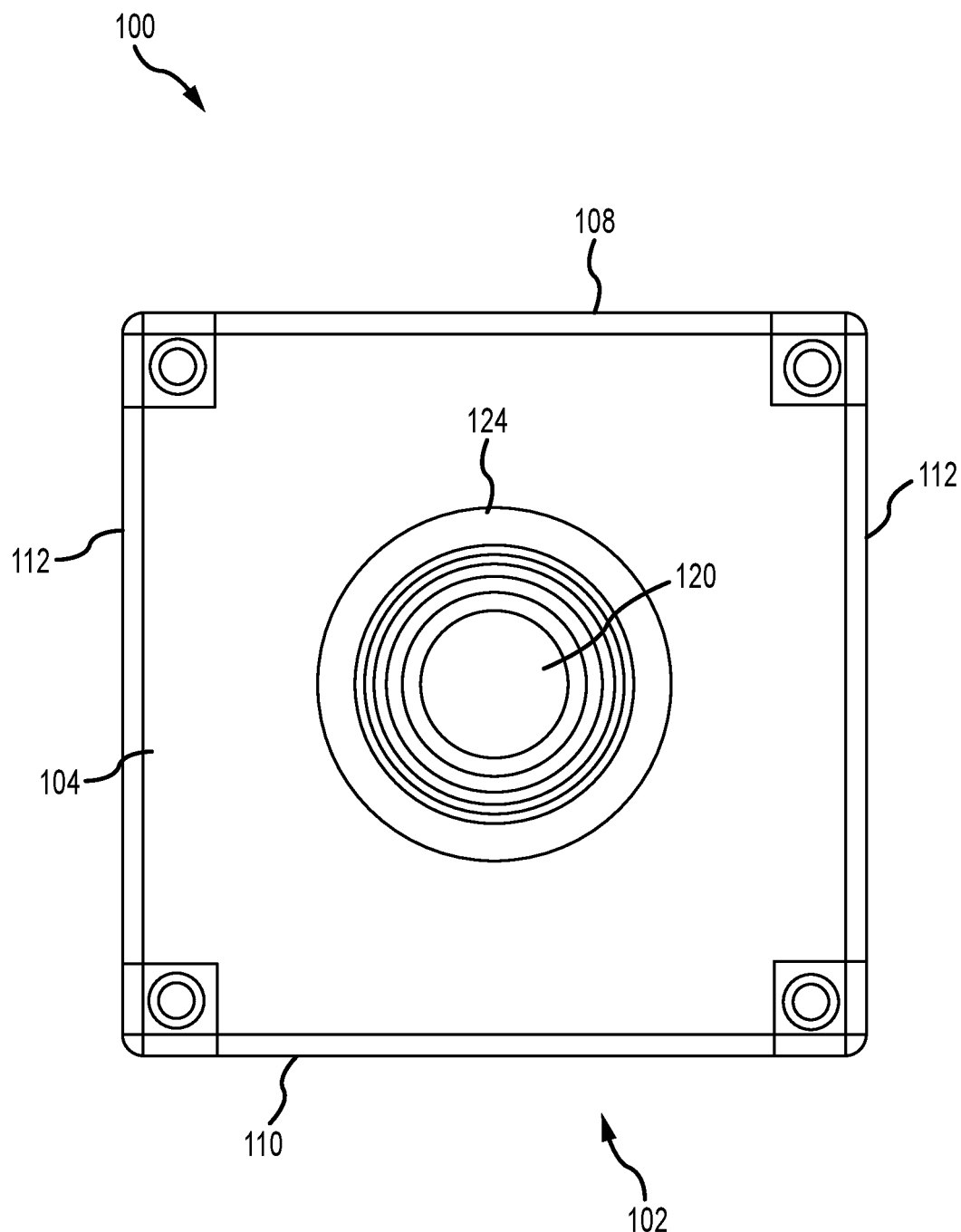
FIG. 1D shows a front elevation view of the camera of FIG. 1A.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the letter.

DETAILED DESCRIPTION OF THE INVENTION

Digital cameras may include processing units that control the functionality of the various electronic components of the camera, such as controlling adjustment of the lens, adjusting aperture and shutter settings, and controlling the image capture and storage. In some cameras, the processing unit may include one or more advanced processors that perform artificial intelligence functions and/or other advanced image processing functions, such as object detection and/or image enhancement features. These advanced processing functions require significant processing power, which may result in the processing unit generating excessive heat. To handle the high temperatures, processing units that perform these advanced functions are often designed to operate in high temperature conditions, often with temperatures as high as 105° C. However, in many cameras, the heat generated by the processing unit, particularly during continuous use, spreads to other components of the camera, including the imaging sensor.

The spread of heat to the imaging sensor may lead to lower imaging quality, as the imaging sensors used in digital cameras are typically sensitive to heat, with many imaging sensors being rated for use at less than 65° C. Moreover, even though the imaging sensors are rated to operate in temperatures approaching 65° C., some degradation of imaging quality may still be observed at operating temperatures below the limit of the imaging sensor. For example, in charge coupled device (CCD) and/or complementary metal oxide semiconductor (CMOS) imaging sensors, image degradation may be observed at between about 50° C. and 60° C., even if the sensor is rated to higher temperatures. This is due to the increase in dark current from the increased temperature, which may cause defects in the imaging quality. Dark current is the current that flows through a photodetector when there is no optical radiation incident on the detection and operating voltages are applied; i.e., the residual current flowing in complete darkness, which may be caused by thermal excitation of electrons as the temperature of the imaging sensor increases. A temperature increase of just 6-8° C. doubles the dark current which may manifest as electrical noise that may reduce the dynamic range of the imaging sensor. This electrical noise may be particularly impactful detrimental to the imaging sensor's ability to record images at low light levels, as the dark current may overwhelm the low amount of light being reflected by the imaged object. Defects, such as ghosting, other artifacts, and/or fuzziness may result from the increased temperature and degrade the image.

Conventionally, to combat the thermal effects of the processor from affecting to the imaging sensor, heat dissipation features, such as heat tubes and/or heat sinks, are often used to direct the heat from the processor in a direction opposite the imaging sensor. However, even with such heat dissipation features, the imaging sensor is often exposed to some of the heat radiating from the processor. To further combat this excess heat, conventional cameras are often designed with larger housings, which enable the imaging sensor to be spaced further from the processor to help reduce the thermal radiation effects on the imaging sensor. However, such solutions hinder the ability to make more compact cameras that have advanced processing capabilities.

The present technology overcomes these challenges by utilizing a camera housing that incorporates an air gap between the imaging sensor and the processing unit. The air gap not only provides physical distance between the imaging sensor and the processing unit to help prevent radiated heat from the processing unit from heating the imaging sensor, but also creates an air flow path that enables air to flow through the air gap and actively dissipate the heat from the processing unit before the heat is able to reach the imaging sensor. Accordingly, the present technology may enable the imaging sensor to be properly shielded from radiant heat from the processing unit, while also enabling the camera to be fit into a smaller, more compact housing.

Although the remaining disclosure will routinely identify specific cameras and housings utilizing the disclosed technology, it will be readily understood that the systems and methods are equally applicable to other imaging systems. Accordingly, the technology should not be considered to be so limited as for use with these specific cameras or housings. The disclosure will discuss one possible camera and camera housing according to embodiments of the present technology before additional variations and adjustments to this system according to embodiments of the present technology are described.

FIGS. 1A-1E illustrate an exemplary embodiment of a camera 100. Camera 100 may include a housing 102 that forms an exterior of the camera 100 and houses internal components of the camera 100. The housing 102 may have any cross-sectional shape and/or size. For example, the cross-section of the housing 102 may be generally rectangular, circular, elliptical, and/or may have any other cross-sectional shape. The cross-sectional shape and/or size of the housing 102 may be constant or vary along a longitudinal axis of the camera 100. As illustrated in the side elevation view of FIG. 1A, the housing 102 may include a front surface 104, a rear surface 106, a top surface 108, a bottom surface 110, and side surfaces 112. One or more surfaces of the housing 102 may be generally flat and/or may have one or more contours or uneven surfaces. Edges formed by the intersection of multiple surfaces may be pointed and/or curved.

The various surfaces may be continuous and/or have one or more disruptions. For example, the top surface 108, bottom surface 110, and/or one or both side surfaces 112 may define an opening that interrupts the continuity of the respective surface. These openings may effectively separate the housing 102 into a forward section 114 and a rear section 116 that are spaced apart by an air gap 118 formed by the openings in the surfaces. In some embodiments, the forward section 114 may include a rear face 121 and the rear section 116 may include a front face 122 that seal the respective sections of the housing 102 and isolate interior components of the camera 100 from the air gap 118. For example, each of the forward section 114 and the rear section 116 form enclosed volumes that house internal components of the camera 100. The enclosed volumes within the interior of the respective housing sections may be joined via a wireway 136 as will be described in greater detail below.

The air gap 118 may be defined between outer faces of one or more of the surfaces. For example, the air gap 118 may be considered to extend to and be constrained by exterior most edges of the housing surfaces that define the openings such that the air gap 118 fills a three dimensional volume formed between the rear face 121, front face 122, and outer edges of each opening within the housing surfaces. The air gap 118 may be directly exposed to the environment on two or more sides of the housing 102. As illustrated, all four sides (top surface 108, bottom surface 110, and side surfaces 112) of the air gap 118 are directly exposed to the environment, while the internal components are sealed within the interior of the housing 102. This enables air to flow through the air gap 118 to dissipate heat and prevent an imaging sensor 128 of the camera 100 from increasing in temperature.

The forward section 114 may define or otherwise define an aperture and/or channel for a lens assembly 120. For example, as best illustrated in the cross-sectional view of FIG. 1B, the front surface 104 may include a protrusion 124 that defines an interior channel 126 that may receive the lens assembly 120 of the camera 100. The lens assembly 120 may include one or more lenses and may be adjustable to adjust a focus and/or zoom of a camera. While illustrated with the protrusion 124 and lens assembly 120 being centered within the front surface 104 (as best seen in the isometric view of FIG. 1C and the front elevation view of FIG. 1D), it will be appreciated that the protrusion 124 and lens assembly 120 may be disposed at any location on the front surface 104 and/or other surface of the housing 102.

Positioned within proximity of the lens assembly 120 may be imaging sensor 128. For example, the image sensor 128 may be disposed within a forward internal compartment 130 defined by forward section 114 of the housing 102, with the imaging sensor 128 being aligned with the lens assembly 120 such that the lens assembly 120 may focus light on the imaging sensor 128. The imaging sensor 128 may be any type of image sensor. For example, the imaging sensor 128 may be a (CMOS) sensor, a (CCD) sensor, a near infrared (IR) sensor, an IR sensor, or other imaging sensor 128. In some embodiments, rather than having a single imaging sensor 128, multiple image sensors may be utilized. In embodiments in which multiple imaging sensors are utilized, the image sensors may all be the same type, while other embodiments may utilize a combination of different types of imaging sensors. The various imaging sensors may be used simultaneously or may be used in groups of one or more sensors. For example, the camera 100 may include multiple imaging modes, some of which may utilize a different subset of imaging sensors 128.

The lens assembly 120 and/or the imaging sensor 128 may be communicatively coupled with a processing unit 132, which may enable the processing unit 132 to control the focus and/or zoom of the lens assembly 120. The control of the lens assembly 120 may be performed automatically by the processing unit 132, based on a remote command (such a command received via a wireless interface), and/or based on an input from one or more electronic interface devices of the camera 100. Coupling the imaging sensor 128 with the processing unit 132 enables the processing unit 132 to control image capture timing and/or image capture settings, as well as enables the processing unit 132 to receive the captured image for subsequent processing and/or storage on a memory unit.

The processing unit 132 may be any kind of processing unit. For example, the processing unit 132 may be an artificial intelligence (AI), computer vision processing unit and/or video processing unit that is programmed to perform AI functions, image processing functions, and/or other advanced processing functions. To perform such functions, the processing unit 132 may include one or more processors. For example, the processing unit 132 may include a combination of one or more central processing units (CPUs), graphical processing units (GPUs), and/or video processing units (VPUs). The processing unit 132 may be coupled with a memory containing instructions that cause the processing unit 132 to perform the desired functions.

The processing unit 132 may be disposed within a rear internal compartment 134 that is defined by the rear section 116 of the housing 102. The processing unit 132 may be coupled with the lens assembly 120 and/or imaging sensor 128 using a wired connection that may extend through wireway 136, which may extend between the front internal compartment 130 and the rear internal compartment 134. For example, the wireway 136 may be a tubular member that defines a communications conduit. One or more wires may extend between the processing unit 132 and the lens assembly 120 and/or the imaging sensor 128. These wires may pass through the communications conduit of the wireway 136. In some embodiments, the interior diameter (or other internal dimension) of the communications conduit may be less than or about 25 mm, less than or about 20 mm, less than or about 15 mm, less than or about 10 mm, less than or about 5 mm, less than or about 3 mm, less than or about 2 mm, less than or about 1 mm, or less. In other embodiments, the internal dimension may be greater than or about 25 mm. Larger dimensions may be particularly useful in embodiments in which multiple wires are disposed within the wireway 136. In some embodiments, a size of the wireway 136 (inner diameter, outer diameter, and/or wall thickness) may be determined based on a structural need. For example, the wireway 136 may be the sole or a primary support for coupling the forward section 114 and the rear section 116. In such embodiments, one or more dimensions of the wireway 136 may be enlarged to provide additional strength and rigidity to the housing 102.

In some embodiments, the wires may include a serial peripheral interface (SPI), a Raspberry Pi flex cable, and/or a printed circuit board film may be disposed within the wireway 136 to couple the processing unit 132 with one or more components of the camera 100. In some embodiments, an inner diameter of the wireway 136 may be selected to substantially match the total size of the one or more wires disposed therein. For example, in embodiments that utilize a Raspberry Pi flex cable having a width of 16 mm, the inner diameter of the wireway 136 may be at least or about 16 mm, at least or about 16.5 mm, at least or about 17 mm, or greater.

While shown as being generally cylindrical, it will be appreciated that the wireway 136 may have any cross-sectional shape. The wireway 136 may be positioned in a center of the housing 102 in alignment with the imaging sensor 128 as illustrated, or may be at any location within the air gap 118. For example, the wireway 136 may be offset from imaging sensor 128, with the wireway 136 being positioned within an interior of the air gap 118 and/or at an edge of the air gap 118. In some embodiments, at least one edge or surface of the wireway 136 may be aligned with one or more surfaces of the housing 102, such as the top surface 108, bottom surface 110, and/or one or both of the side surfaces 112.

The forward section 114 and rear section 116 may be connected by wireway 136 and/or one or more frame members 138 that may extend between and couple the forward section 114 and rear section 116. In some embodiments, some or all the frame members 138 may be formed from portions of one or more of the top surface 108, bottom surface 110, and/or one or both side surfaces 112. For example, as illustrated, each frame member 138 is formed from two adjacent surfaces, such as the top surface 108 and one of the side surfaces 112 and the bottom surface 110 and one of the side surfaces 112. In some embodiments, rather than being formed from multiple surfaces, one or more of the frame members 138 may be formed from a single surface, such as just the top surface 108, just the bottom surface 110, or just one of the side surfaces 112. While shown with frame members 138 being positioned in corners of the housing 102, it will be appreciated that some or all the frame members 138 may be formed at medial or otherwise interior positions on a given surface of the housing 102. Additionally, while four frame members 138 are illustrated, any number of frame members 138 (including zero or a single frame member 138) may be utilized in some embodiments. In some embodiments, one or more frame members 138 may be offset from the top surface 108, bottom surface 110, and/or one or both side surfaces 112 in an inward direction such that the frame members 138 are within an interior of the air gap 118. Some embodiments may be devoid of frame members 138. In such embodiments, the forward section 114 and rear section 116 may be coupled solely by the wireway 136. In some embodiments, rather than being a standalone feature, the wireway 136 may be incorporated into one or more of the frame members 138.

The air gap 118 may separate the forward section 114 and the rear section 116 in order to space the imaging sensor 128 from the processing unit 132. This enables the air gap 118 to help prevent heat generated by operation of the processing unit 132 from spreading to the imaging sensor 128. By reducing or preventing heat from the processing unit 132 from heating the imaging sensor 128, dark current in the imaging sensor 128 may be reduced or eliminated, which may lead to higher image quality, particularly in low light environments. This may further enable the housing 102 to be made smaller and more compact without sacrificing image quality. The air gap 118 may not only increase the distance between the imaging sensor 128 and the processing unit 132, but may also provide an air flow path that may enable cooler air to flow through the air gap 118 and further dissipate heat from the processing unit 132 prior to the heat causing a temperature of the imaging sensor 128 to increase. To provide the necessary air flow, the air gap 118 may be open on at least two different surfaces of the housing 102. In some embodiments, such as that shown in FIGS. 1A-1E, the air gap 118 may be exposed on all sides, which may help maximize the amount of airflow through the air gap 118 to further increase the amount of cooling effect. For example, each of the top surface 108, bottom surface 110, and side surfaces 112 define an opening, which may facilitate airflow through the air gap 118 in any direction.

In some embodiments, the air gap 118 may be substantially open. In other words, a significant portion of an outer boundary of the air gap 118 is devoid of frame members 138 or other structure. For example, an open area (with no physical structures to impede airflow through the air gap 118) of the outer boundary of the air gap 118 may be at least or about 25%, at least or about 30%, at least or about 35%, at least or about 40%, at least or about 45%, at least or about 50% at least or about 55%, at least or about 60%, at least or about 65%, at least or about 70%, at least or about 75%, at least or about 80%, at least or about 85%, at least or about 90%, at least or about 95%, or more, with greater percentages leading to greater airflow through the air gap 118.

A width of the air gap 118 may be selected based on an amount of heat to be dissipated, a desired operating temperature of the imaging sensor 128, a maximum operational temperature of the processing unit 132, and/or other factors. In some embodiments, the air gap 118 may have a width of at least or about 5 mm, at least or about 10 mm, at least or about 15 mm, at least or about 20 mm, at least or about 25 mm, at least or about 30 mm, at least or about 35 mm, at least or about 40 mm, at least or about 45 mm, at least or about 50 mm, at least or about 75 mm, at least or about 100 mm, or more, with larger gaps providing greater heat isolation for the imaging sensor 128.

In some embodiments, the air gap 118 may be defined by and in contact only with exterior facing surfaces of the housing 102. For example, internal and/or electrical components of the camera 100 are isolated from the air gap 118 and contained within or coupled with the forward section 114, rear section 116, and/or wireway 136. Such a design may enable the housing 102 to be dustproof and/or waterproof.

Figure 1E:
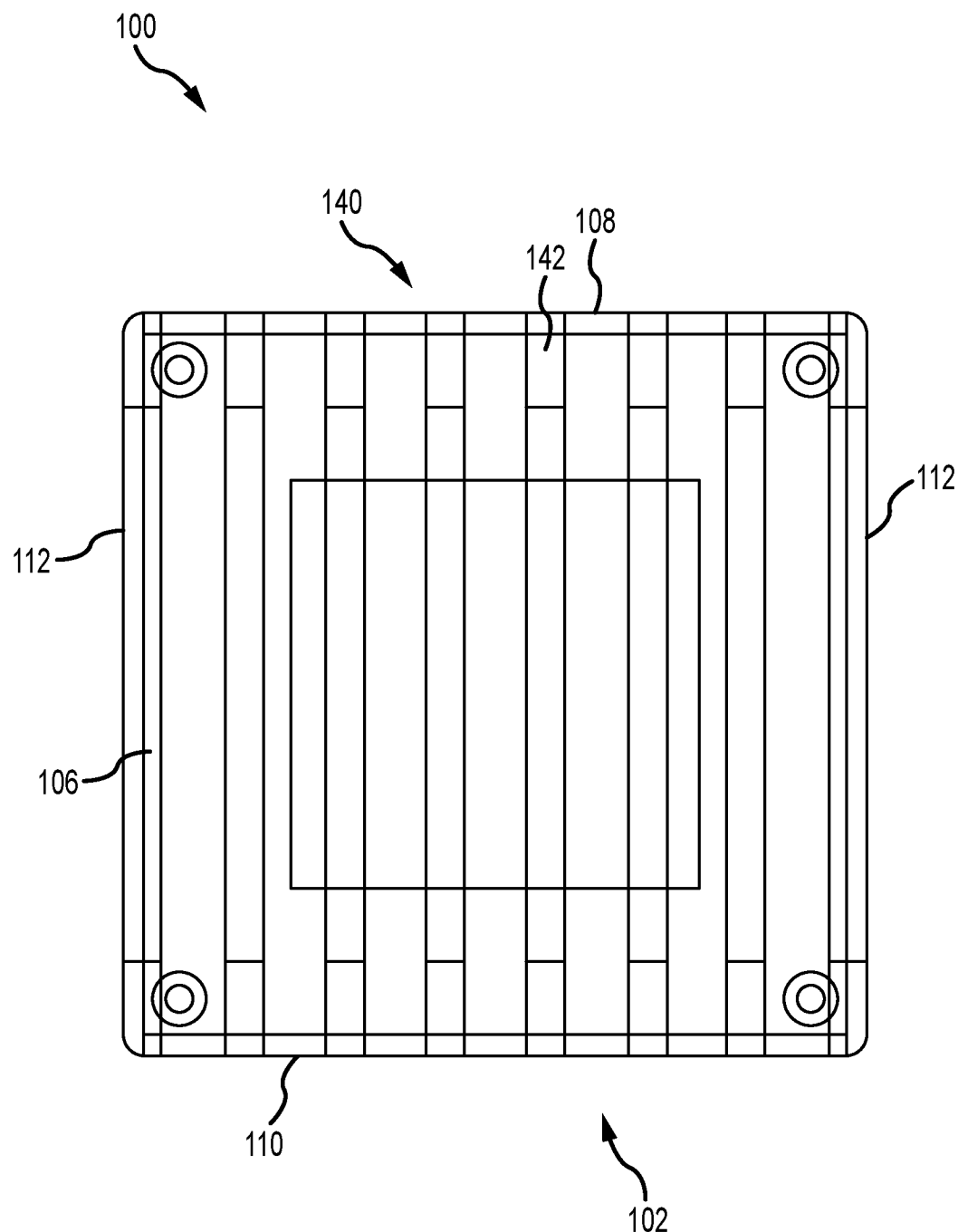
FIG. 1E shows a rear elevation view of the camera of FIG. 1A.

In some embodiments, the housing 102 may include one or more heat dissipation features. For example, the imaging sensor 128, processing unit 132, and/or other heat producing and/or heat sensitive components of the camera 100 may be thermally coupled with one or more heat dissipation elements, such as a heat sink, a heat tube, use of heat conductive materials, and/or other heat dissipation techniques. For example, a rear portion of the housing 102 may include a heat sink 140 that is coupled with and positioned proximate the processing unit 132. The heat sink 140 may be made of a thermally conductive material (such as a metallic material) that is thermally coupled with the processing unit 132, either directly or via one or more intervening components, such as a heat tube. As illustrated in FIG. 1E, the heat sink 140 may include a number of fins 142 that may help increase the surface area of the heat sink 140 to better dissipate larger amounts of heat. Any number of fins 142 or other features may be utilized. In some embodiments, the fins 142 may be oriented horizontally and/or diagonally rather than, or in addition to, the illustrated vertical arrangement.

In some embodiments, some or all of the housing 102 positioned between the processing unit 132 and the imaging sensor 128 may be formed from a material with low thermal conductivity, such as a plastic or other polymer, glass, rubber, and/or other material. For example, the wireway 136, frame members 138, front portion of the rear section 116, and/or some or all of the forward section 114 may be formed from a low thermal conductivity material. The thermal conductivity of the material may be less than or about 3 W/mK, less than or about 2.5 W/mK, less than or about 2 W/mk, less than or about 1.5 W/mK, less than or about 1.0 W/mK, less than or about 0.75 W/mK, less than or about 0.50 W/mK, less than or about 0.25 W/mK, less than or about 0.10 W/mK, less than or about 0.05 W/mK, less than or about 0.025 W/mK, or less. The use of such materials may help prevent heat generated by operation of the processing unit 132 from radiating to the imaging sensor 128.

The camera 100 may include any number of additional components, such as a wireless assembly (which may include a wireless unit processor and/or one or more wireless antennae), any number of user interfaces (such as a keypad, a touchscreen, one or more buttons, one or more dials, and/or other user interface devices as known in the art), a power module, a storage unit, indicators (such as lights and/or speakers), microphones, and the like.

Figure 2:
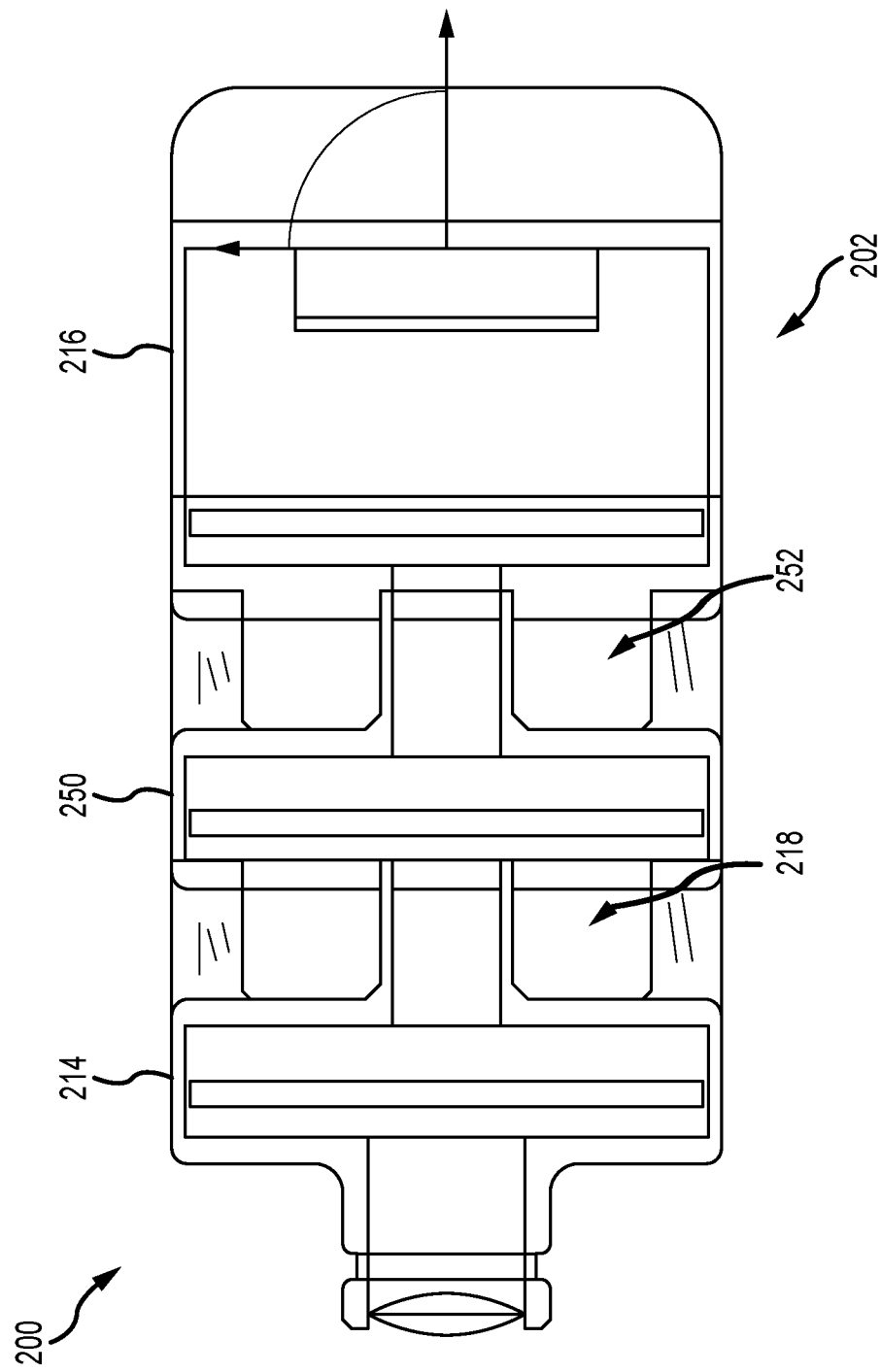
FIG. 2 shows a side elevation view of an exemplary camera according to some embodiments of the present technology.

FIG. 2 illustrates a schematic cross-sectional side elevation view of a camera 200 according to some embodiments of the present technology. FIG. 2 may include one or more components discussed above with regard to FIGS. 1A-1E, and may illustrate further details relating to that camera. Camera 200 is understood to include any feature or aspect of camera 100 discussed previously. Camera 200 may include a housing 202 having a forward section 214 and a rear section 216. As discussed above, the forward section 214 may house a lens assembly and imaging sensor (not shown) and rear section 216 may house a processing unit (not shown). Camera 200 may further include a medial section 250 that is disposed between the forward section 214 and the rear section 216. The medial section 250 may be separated from the forward section 214 by a first air gap 218. The medial section 250 may be separated from the rear section 216 by a second air gap 252. In some embodiments, the medial section 250 may define an interior compartment that houses one or more internal components of the camera 200. For example, a thermally sensitive and/or heat producing component may be disposed within the interior compartment of the medial section 250. In one particular example, a wireless assembly (which may include a wireless unit processor and/or one or more wireless antennae) may be housed within the interior compartment of the medial section 250. By including a medial section 250 separated from other housing sections via air gaps, the camera 200 may provide a single housing 202 that helps thermally isolate the wireless assembly and imaging sensor. The imaging sensor may be particularly isolated from heat from the processing unit due to the presence of multiple air gaps between the imaging sensor and the processing unit.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

As used herein and in the appended claims, the singular forms "a", "an", and "the" include plural references unless the context clearly dictates otherwise. Thus, for example, reference to "an aperture" includes a plurality of such apertures, and reference to "the opening" includes reference to one or more openings and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A camera, comprising:
   a housing comprising:
      a forward section defining a forward internal compartment;
      a rear section defining a rear internal compartment, wherein the rear section comprises a heat dissipation element; wherein the forward section and the rear section are separated by an air gap that extends through an entire thickness of the housing;
      a communications conduit that extends between and couples the forward internal compartment with the rear internal compartment, the communications conduit extending through the air gap;
   an imaging sensor disposed within the forward internal compartment;
   a processing unit disposed within the rear internal compartment and communicatively coupled with the imaging sensor; and
   a wire disposed within an interior of the communications conduit, the wire electronically coupling the imaging sensor with the processing unit.

2. The camera of claim 1, wherein:
   at least a portion of the housing disposed between the imaging sensor and the processing unit is formed from a low thermal conductivity material.

3. The camera of claim 2, wherein:
   the material has a thermal conductivity of less than 3 W/mK.

4. The camera of claim 1, wherein:
   the communications conduit is in alignment with the imaging sensor.

5. The camera of claim 1, wherein:
   the forward section comprises a protrusion that defines a channel; and
   a lens assembly is disposed within the channel.

6. The camera of claim 1, wherein:
   the heat dissipation element comprises one or both of a heat sink and a heat tube.

7. The camera of claim 1, further comprising:
   a medial section disposed between the forward section and the rear section, wherein:
      the air gap is disposed between the forward section and the rear section; and
      the medial section and the rear section are separated by an additional air gap.

8. The camera of claim 7, further comprising:
   a wireless assembly disposed in the medial section.

9. A camera housing, comprising:
   a forward section defining a forward internal compartment;
   a rear section defining a rear internal compartment, wherein an exterior surface of the rear section comprises a heat dissipation element; wherein the forward section and the rear section are separated by an air gap that extends through an entire thickness of the camera housing; and
   a communications conduit coupling the forward internal compartment with the rear internal compartment.

10. The camera housing of claim 9, wherein:
the air gap is defined by and in contact only with exterior facing surfaces of the camera housing.

11. The camera housing of claim 9, wherein:
the air gap separates the forward section and the rear section by at least 1 mm.

12. The camera housing of claim 9, wherein:
the camera housing is one or both of dustproof and waterproof.

13. The camera housing of claim 9, wherein:
the air gap is open on at least two sides.

14. The camera housing of claim 9, further comprising:
at least one frame member that couples the forward section and the rear section.

15. The camera housing of claim 9, wherein:
at least 25% of an outer boundary of the air gap is devoid of structure elements.

16. The camera housing of claim 9, wherein:
the communications conduit has an inner diameter of less 25 mm.

17. A camera housing, comprising:
a forward section defining a forward internal compartment;
a rear section defining a rear internal compartment, wherein the rear section comprises a heat dissipation element; wherein the forward section and the rear section are separated by an air gap having a width of at least 5 mm that extends through an entire thickness of the camera housing, wherein the air gap extends through at least three exterior surfaces of the camera housing; and
a communications conduit coupling the forward internal compartment with the rear internal compartment.

18. The camera housing of claim 17, further comprising:
a medial section disposed between the forward section and the rear section, wherein:
the air gap is disposed between the forward section and the rear section; and
the medial section and the rear section are separated by an additional air gap.

19. The camera housing of claim 18, wherein:
a width of the air gap and a width of the additional air gap are different.

20. The camera housing of claim 18, wherein:
a width of the air gap and a width of the additional air gap are equal.

* * * * *